United States Patent Office 3,479,742
Patented Nov. 25, 1969

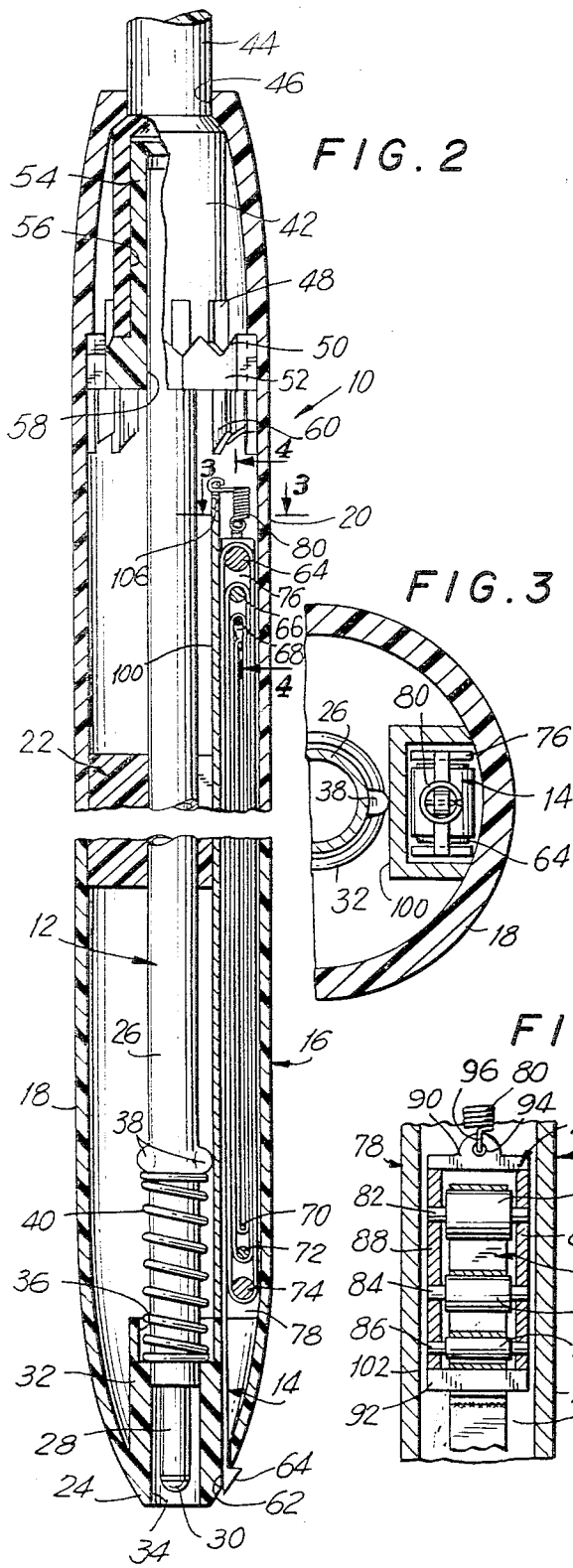
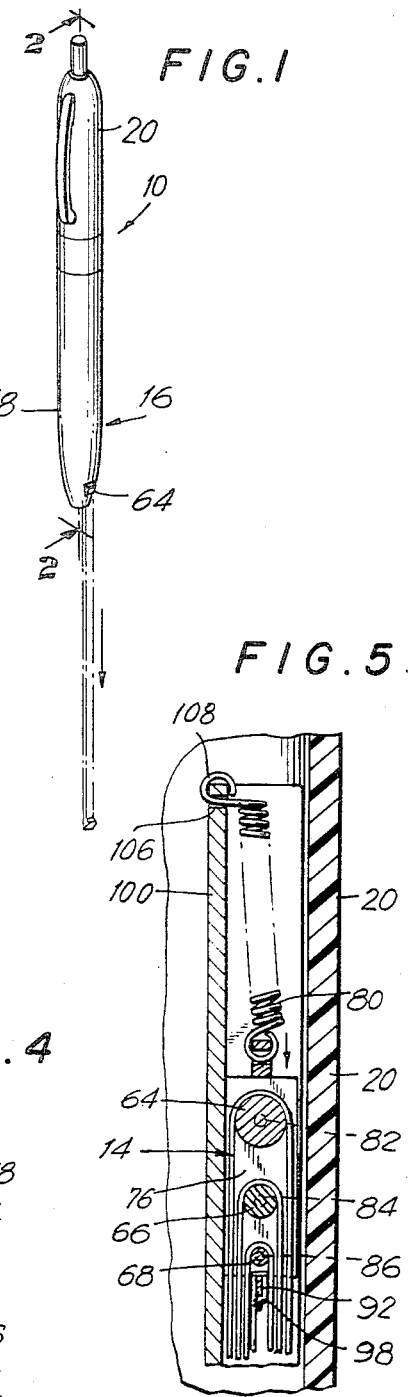

3,479,742
MARKING AND MEASURING IMPLEMENT
Arnold Starkenberg, New York, N.Y.
(325 Marine Ave., Brooklyn, N.Y. 11209)
Filed Oct. 31, 1968, Ser. No. 772,234
Int. Cl. B43l 9/00
U.S. Cl. 33—27                               11 Claims

ABSTRACT OF THE DISCLOSURE

Combined marking and measuring implement configured to substantially the configuration of a conventional writing instrument having an elongated housing or barrel and a marking tip extending outwardly of one end thereof and a flexible measuring tape carried within the housing or barrel and extendable outwardly of the same end portion thereof adjacent the marking tip.

---

This invention relates to a combined marking and measuring implement having marking and measuring portions which may be utilized either independently or in cooperation with one another.

A primary object of the present invention is to provide a combined marking and measuring implement having a marking portion and a flexible, retractable measuring portion, where the marking portion is in close proximity to the measuring portion as it is drawn from the housing, thus providing an effect where the marking portion may be used to a threefold advantage, for writing, for measuring, and as an effective compass.

Another primary object of the present invention, in addition to the foregoing object, is to provide such a marking and measuring implement where the marking portion comprises a retractable marking device, such as a ballpoint pen cartridge.

Yet another primary object of the present invention, in addition to each of the foregoing objects, is the provision of such implement wherein the operation of the marking portion and the overall appearance are not affected.

Yet still another primary object of the present invention, in addition to each of the foregoing objects, is the provision of novel and improved retractable measuring means.

Another and yet still further primary object of the present invention, in addition to each of the foregoing objects, is the provision of implements which are inexpensive to manufacture while yet being durable in use.

Still further, it is yet another primary object of the present invention, in addition to each of the foregoing objects, to provide novel and improved means for retaining a retractable or flexible measuring implement withdrawn a desired distance outwardly of the housing therefor.

Yet further, it is still another primary object of the present invention to provide novel and improved apparatus for storage of a retractable tapemeasure within a housing.

The invention resides in the combination, construction, arrangement and disposition of the various component parts and elements incorporated in improved marking and measuring implements constructed in accordance with the principles of this invention. The present invention will be better understood and objects and important features other than those specifically enumerated above will become apparent when consideration is given to the following details and description, which when taken in conjunction with the annexed drawing describes, discloses, illustrates and shows certain preferred embodiments or modifications of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIG. 1 is a perspective view of a marking and measuring implement constructed in accordance with the principles of the present invention;

FIG. 2 is an elevational cross-sectional view taken along line 2—2 of FIG. 1;

FIG. 3 is a cross-sectional plan partial view taken along line 3—3 of FIG. 2;

FIG. 4 is a side elevational cross-sectional partial view taken along line 4—4 of FIG. 2;

FIG. 5 is an enlarged elevational cross-sectional view of the upper end portion of the measuring portion, similar to FIG. 2;

Figure 6:
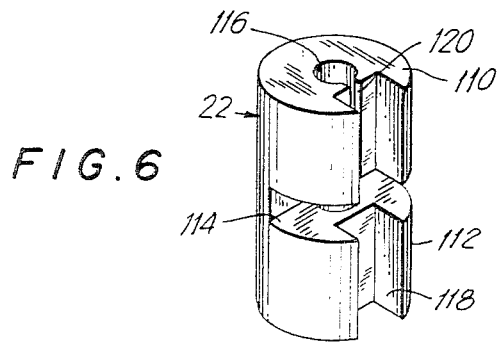
FIG. 6 is a perspective view of a cap-to-barrel connector suitable for use with the present invention.
Figure 7:
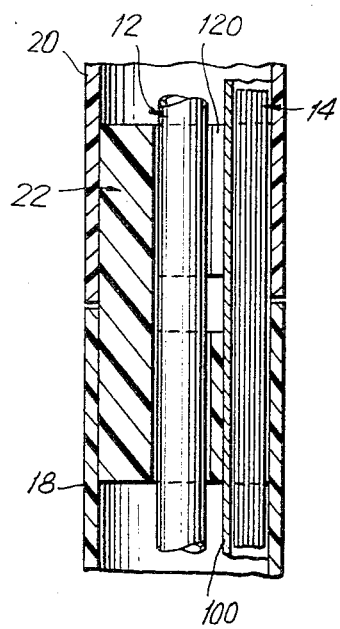
FIG. 7 is an enlarged cross-sectional partial view of the central portion of the implement of the preceding figures showing the positioning of the connector of the preceding figure.
Figure 8:
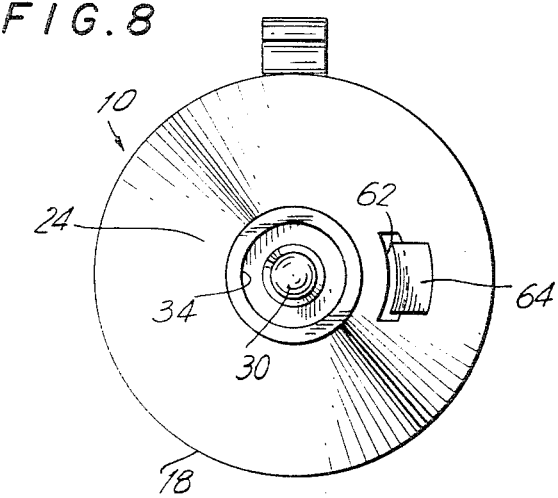
FIG. 8 is an end-on view of the implement of the preceding figures looking into the marking end thereof.

With reference now to the drawing, there is shown and illustrated a combined marking and measuring implement constructed in accordance with the principles of the present invention and generally designated by the reference character 10. The combined marking and measuring implement 10 may comprise a marking portion comprising, for example, a ball point pen unit 12 of any desired construction and a measuring portion comprising, for example, a cloth or plastic web or tape 14. It is to be expressly understood, however, that the present invention is not to be deemed limited to the specific marking and measuring portions shown and illustrated but, rather, may comprise substantially any desired marking and measuring means capable of being disposed relative to one another generally in accordance with the present invention.

More particularly, the marking and measuring portions 12 and 14, respectively, may be contained within a housing designated generally by the reference character 16 which may be configured, as shown and illustrated, to a generally conventional pen-type configuration and comprising a lower or barrel portion 18 and an upper or cap portion 20 secured one above the other in axial alignment, as by means of a connector 22. The marking portion or pen unit 12 and the measuring portion or tape unit 14 are both contained with the housing 16 and may be constructed and arranged as to be retractable relative thereto and capable of manual projection outwardly through the tip portion 24 of the barrel 18 in close proximity to one another so that distances indicated by the measuring portion or tape unit 14 may be readily and easily marked off by the marking portion 12 and yet further to enable the measuring portion 14 to define the locus of the marking portion 12 so that the combined marking and measuring implement 10 may be utilized to scribe an arc or circle, in the manner of a compass.

The supporting and actuating structure for the retractable pen unit 12 may, as heretofore pointed out, be of substantially any desired construction and may, for example, be of the conventional construction shown and illustrated. Since the construction shown and illustrated is generally conventional, it will not be described in detail, but only sketchily. Hence, the pen unit 12 may comprise a plastic or metal generally tubular ink reservoir 26 and a tip portion 28 extending outwardly at one end portion thereof and terminating at a ball tip ink applying member 30.

The tip portion 24 of the barrel 18 may be provided with a generally inwardly extending boss 32 provided with a bore or hole 34 extending generally axially inwardly from the barrel tip portion 24 and terminating at a counterbore 36 extending generally toward the barrel tip portion 24 from the inner end of the boss 32. The bore or hole 34 may be of such a diameter as to form a guard for the tip portion end of the reservoir tube 26.

The reservoir tube 26 may be provided with a plurality of ears 38 extending generally radially outwardly thereof in spaced apart relationship to the tip portion 28 and biasing means, such as a helical spring 40 may be positioned circumferentially of the reservoir tube 26 with one end portion thereof abutting the ears 38 and the other end portion thereof disposed within the counterbore 36. Hence, the spring 40 will bias the marking portion 12 generally inwardly of the barrel 18.

Within the cap 20, there may be provided an actuator 42 having a reduced diameter portion 44 extending generally outwardly through a hole 46 provided at the end of the cap 20. The lower end portion of the actuator 42 is provided with a plurality of teeth 48 adapted to cooperate with a plurality of mating teeth 50 provided on a pen positioning member 52. The pen positioning member 52 comprises an upwardly extending spindle portion 54 which fits within an aperture or bore 56 extending upwardly into the actuator 42. The pen positioning member 52 is, in turn, provided with a bore 58 for receiving the upper end portion of the pen 12.

The interior of the cap 20 is provided with a plurality of elongated bosses for cooperation with the teeth 48 and 50 to define retracted and extended positions for the pen 12 upon alternate depressions of the actuator reduced diameter portion 44.

Accordingly, upon alternate depressions of the actuator reduced diameter portion 44, the ball tip 30 of the pen 12 will be alternately extended outwardly of the barrel 18 for use and retracted inwardly thereof for storage.

The tip portion 24 of the barrel 18 may be further provided with an aperture, such as an arcuate slot 62 adjacent the bore or hole 34 through which the measuring tape 14 is particularly adapted to be extended. It is to be emphasized that the arcuate slot 62 should be closely adjacent the hole or bore 34 and hence, closely adjacent the ball tip 30 of the marking portion 12. The end portion 64 of the measuring tape 14 extending through the arcuate slot 62 may be enlarged, as illustrated or otherwise provided with a tip or other means precluding inadvertent passage of the end portion 64 completely through the arcuate slot 62 and into the interior of the housing 16. Hence, the end portion 64 of the measuring tape 14 may be readily grasped or gripped to withdraw the measuring tape 14 outwardly through the arcuate slot 62 so that the measuring tape 14 may be utilized for measuring purposes. Yet further, a slight twisting of the barrel 18 is effective to jam the measuring tape 14 into the corners or end portions of the arcuate slot 62 and hence hold the measuring tape 14 in the desired extent of withdrawal. Yet further, if desired, the end portions of the slot 62 may be tapered or brought closer together, to enhance such jamming action.

The measuring tape 14 may be stored within the confines of the housing 16 by winding the length thereof in decreasing elongated coils or loops over a plurality of rollers, such as the six rollers 64, 66, 68, 70, 72 and 74, in a manner similar to a block and tackle. The rollers 64, 66 and 68 may, for example, be rotatably supported in a movable pulley or roller block 76 and the rollers 70, 72 and 74 rotatably supported on a fixed pulley or roller block 78. The fixed pulley or roller block 78 may be elongated, as shown, to extend substantially entirely longitudinally of the interior of the housing so as to define a slide for the movable block 76 and fixed anchor point for a spring 80 urging the movable block 76 away from the tip portion 24 of the barrel 18, so as to bias the tape 14 towards a retracted position thereof. The rollers 64, 66 and 68 may be rotatably mounted with the movable block 76, as by means of axles or pins 82, 84 and 86, respectively, extending through the side walls of the movable block 76, as shown, the side walls 88 being spaced apart and generally parallel one another. The movable block 76 may further comprise end walls 90 and 92 extending generally transversely across and between the ends of the side walls 88, the upper end wall 90 being provided, for example, with an aperture 94 for engagement by the lower end loop 96 of the spring 80 and the lower end wall 92 forming an anchoring point for the measuring tape 14, as by extending through a loop 98 provided at the end thereof.

The fixed block 78 may, for example, be of generally U-shaped cross-sectional configuration, comprising a back wall 100 and a pair of generally parallel spaced apart side walls 102 and 104 extending generally forwardly thereof on either side of the movabe block 76 and measuring tape 14. The lower rollers 70, 72 and 74 may be rotatably supported, as by means of axles or pins extending through the side walls 102 and 104 thereof. The upper end portion of the back wall 100 may be provided, for example, with an aperture 106 to enable the upper end loop 108 of the spring 80 to be secured therewith.

The fixed block 78 may, therefore, be referred to as defining an elongated channel extending generally longitudinally of the housing 16 for containing therewithin a plurality of courses or runs of the measuring tape 14, the courses or runs extending from tape end loop 98 secured with the movable block 76, around the inner fixed roller 70, around the inner movable roller 68, around the medial fixed roller 72, around the medial movable roller 76, around the outer fixed roller 74, around the outer movable roller 64 and finally, outwardly through the arcuate slot 62. As shown, the rollers 64, 66 and 68, as well as the rollers 74, 72 and 70 may be of generally decreasing diameter, the diametral decrease being the same or slightly greater than twice the thickness of the measuring tape 14 so as to reduce frictional pull between adjacent tape courses. Hence, it is now believed readily apparent that upon pulling the outward end portions 64 of the measuring tape 14 downwardly and outwardly through the arcuate slot 64, the movable block 76 will be pulled downwardly, stretching the coil spring 80 and enabling the measuring tape 14 to be extended outwardly of the housing 16. Yet further, it is believed readily obvious that since there are illustrated seven courses or runs of measuring tape within the housing 16, a substantial length of measuring tape may be readily and easily stored therein. For example, if the average length of each course or run of measuring tape 14 within the housing 16 in the fully retracted position is about four inches, then approximately twenty-eight inches of measuring tape will be available. As a practical matter, however, due to the length of the blocks and the amount of material stored within the housing even and the fully extended orientation, the useful length of measuring tape is substantially less than that twenty-eight inches. However, a useful length substantially in excess of fifteen inches may be readily and easily stored within a pen housing of conventional size, in accordance with the present invention.

The channel or fixed block 76 may be positioned within the housing 16 with the lower end portion thereof abutting the counterbore 32 and being further retained in position by the connector block 22.

As heretofore pointed out, the connector block 22 provides for retaining the cap and barrel in their assembled relationship. The connector 22 may, for example, be of generally cylindrical configuration, comprising an upper portion 110 and a lower portion 112, the separation therebetween being defined, for example, by a transversely extending slot 114. A generally axially extending bore 116 may be provided to enable passage therethrough of the marking pen 12 and a generally rectangular slot 118 may be provided extending entirely longitudinally thereof and radially inwardly in the same direction as the slot 114 to enable passage therethrough of the fixed block or channel portion 78. Yet further, a slot 120 may be provided extending from the base of the rectangular slot 118 through to the bore 116 in the upper portion 110 of the connector 22 to define a spring action to the upper portion of the connector 22. Hence, the lower portion 112 may be press fit into the barrel 18 and, accordingly, securely substantially rigidly positioned relative thereto with the upper portion 110 of the connector block 22 extending generally upwardly outwardly thereof. Then, the cap 20 may be readily and easily assembled or disassembled onto the springy upper portion 110, enabling the pen to be readily assembled and disassembled for replacement of the marking unit 12, as necessary.

Figure 9:
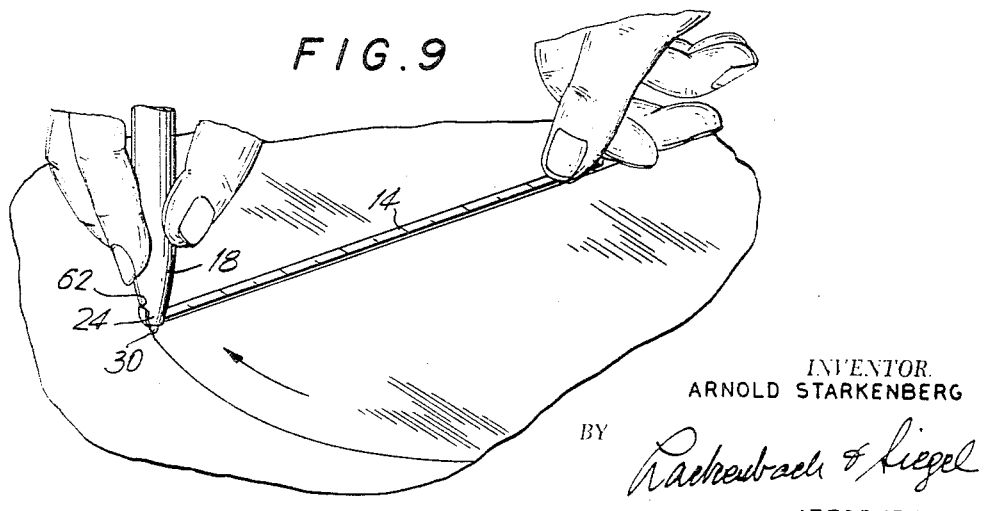
FIG. 9 is a pictorial illustration showing the manner in which the implement of the present invention may be utilized.

It is to be once again emphasized, that the measuring tape 14 of the present invention may be extended generally outwardly of the housing 16 generally adjacent the ball tip 30 of the marking portion 12 so that the marking unit 12 may be readily and easily utilized in conjunction with the measuring unit 14, as shown, for example, in FIG. 9 of the drawing, either for marking or sequential distances or for scribing arcs or circles.

It is to be understood that terminology such as "upper," "lower," "upwardly," and "downwardly," as used in the preceding decription and subjoined claims, along with other similar directional terminology, is to be construed and interpreted in its normal and accepted sense. However, such terminology is not to be construed and interpreted in a limiting sense either in the preceding description or the subjoined claims, since the same is used merely to facilitate an understanding of, and to clearly set forth and particularly define the present invention.

While the invention has been described, disclosed, illustrated and shown in terms of an embodiment or modification which it has assumed in practice, the scope of the invention should not be deemed to be limited by the precise embodiment or modification herein described. disclosed, illustrated or shown, such other embodiment or modification as may be suggested to those having the benefit of the teaching herein being intended to be reserved especially as they fall within the scope and spirit of the invention.

What is claimed is:

1. Combined marking and measuring implement comprising, in combination, an elongated housing, a marking portion having a marking tip extending outwardly generally centrally of one end portion of said housing and an elongated flexible and retractable measuring portion extendable generally longitudinally outwardly of said one end portion of said housing from a location adjacent said marking tip so that said marking and meauring portions may be utilized independently of one another or in cooperation for marking off distances and defining arcs and circles.

2. Implement defined in claim 1 wherein said measuring portion comprises a plurality of courses disposed generally longitudinally within the housing over a plurality of rollers, at least one of said rollers being movable relative to at least another of said rollers.

3. Implement defined in claim 2 wherein said marking portion is retractable relative to said housing along a path generally parallel the path of retraction of said measuring portion.

4. Combined marking and measuring implement comprising, in combination, a housing, a marking portion having a marking tip extending outwardly of said housing and an elongated flexible and retractable measuring portion extendable outwardly of said housing from a location adjacent said marking tip and a plurality of rollers disposed within the housing, wherein at least one of said plurality of rollers is disposed on a movable block adapted for movement within said housing generally longitudinally thereof and wherein said measuring portion comprises a plurality of courses disposed around said rollers.

5. Implement defined in claim 4 wherein said movable block is spring biased for movement in a direction tending to cause retraction of said measuring portion within said housing.

6. Marking implement defined in claim 1 wherein said measuring portion comprises a bodily flexible tape and said housing is provided with an arcuate slot extending generally coaxially of said marking tip so that said tape may be extended therethrough directly past said marking tip for rapid and easy marking off of distances measured thereby without distortion.

7. Combined marking and measuring implement comprising, in combination, a housing, a marking portion having a marking tip extending outwardly of said housing and an elongated flexible and retractable measuring portion extendable outwardly of said housing from a location adjacent said marking tip, enabling utilization of said marking and measuring portions independently of one another or in cooperation for marking off distances and defining arcs and circles and wherein said housing and said marking portion together comprise a conventional writing implement having a writing unit extending generally axially therethrough and said measuring implement is disposed at one side thereof.

8. Implement defined in claim 7 wherein said measuring implement comprises a plurality of courses of tape passing around a plurality of rollers mounted with a fixed block and a block movable relative thereto.

9. Implement defined in claim 8 wherein said fixed block defines a generally U-shaped channel, said movable block being slidably positioned within said channel.

10. Implement defined in claim 9 wherein each of said movable and fixed blocks are provided with a plurality of pulleys for said courses of tape, said pulleys being of progressively decreasing diameter to reduce friction between adjacent courses of tape.

11. Implement defined in claim 10 wherein said housing comprises separable cap and barrel portions and further comprising a connector block extending between said cap and barrel portions and fixedly secured with one of said cap and barrel portions and removably engaged with the other thereof to enable removal of said cap portion for replacement of the marking portion.

References Cited

UNITED STATES PATENTS

| 720,507 | 2/1903 | Van Horn. |
| 966,473 | 8/1910 | Richardson. |
| 1,613,676 | 1/1927 | Raphael _____ 33—138 |

FOREIGN PATENTS

| 183,917 | 7/1922 | Great Britain. |
| 19,744 | 8/1905 | Sweden. |

HARRY N. HAROIAN, Primary Examiner

U.S. Cl. X.R.

33—138